United States Patent
Goodwin, III

[11] Patent Number: 5,926,797
[45] Date of Patent: Jul. 20, 1999

[54] METHOD OF ASSIGNING ELECTRONIC PRICE LABELS TO GROUPS OF PRICE LOOKUP FILE ITEMS

[75] Inventor: John C. Goodwin, III, Suwanee, Ga.

[73] Assignee: NCR Corporation, Dayton, Ohio

[21] Appl. No.: 08/723,705

[22] Filed: Sep. 30, 1996

[51] Int. Cl.[6] ................................................. G06F 17/60
[52] U.S. Cl. .............................. 705/20; 705/16; 235/383; 340/825.35
[58] Field of Search .................................. 705/1, 20, 28; 235/383; 340/825.35

[56] References Cited

U.S. PATENT DOCUMENTS

| | | | |
|---|---|---|---|
| 4,002,886 | 1/1977 | Sundelin | 235/383 |
| 4,500,880 | 2/1985 | Gomersall et al. | 340/825.35 |
| 5,111,196 | 5/1992 | Hunt | 235/383 X |
| 5,172,314 | 12/1992 | Poland et al. | 705/1 |
| 5,241,657 | 8/1993 | Fine et al. | 345/501 |
| 5,473,146 | 12/1995 | Goodwin, III | 235/383 |
| 5,572,653 | 11/1996 | DeTemple et al. | 345/501 |
| 5,619,416 | 4/1997 | Kosarew | 235/375 X |
| 5,663,963 | 9/1997 | Goodwin, III | 371/5.1 |
| 5,694,418 | 12/1997 | Goodwin, III | 235/378 X |
| 5,729,696 | 3/1998 | Goodwin, III et al. | 705/22 |
| 5,751,919 | 5/1998 | Goodwin, III | 395/101 |
| 5,753,900 | 5/1998 | Goodwin, III et al. | 235/383 X |
| 5,754,106 | 5/1998 | Goodwin, III | 340/540 |
| 5,758,064 | 5/1998 | Zimmerman et al. | 235/383 X |
| 5,794,211 | 8/1998 | Goodwin, III et al. | 705/23 |
| 5,794,215 | 8/1998 | Goodwin, III | 705/26 |
| 5,797,132 | 8/1998 | Altwasser | 705/16 |

*Primary Examiner*—Eric W. Stamber
*Assistant Examiner*—Michele Stuckey Crecca
*Attorney, Agent, or Firm*—Paul W. Martin; Peter H. Priest

[57] ABSTRACT

A method of assigning electronic price labels (EPLs) to groups of price look-up file items which is based upon the price change frequencies of the items in the groups. The items are divided into a plurality of groups. Price change frequencies for items within each group are determined. A minimum price change frequency for each group is determined. In a first embodiment, EPLs are assigned to items in any one of the groups only if a predetermined number of the price change frequencies in the one group exceed a predetermined minimum price change frequency for the one group. In a second embodiment, the groups are ranked starting with a first group having a highest number of items that exceed the minimum price change frequency for the first group and ending with a second group having a lowest number of items that exceed the minimum price change frequency for the second group, and EPLs are assigned to a plurality of items less than the totality of items by order of rank of the groups, beginning with the items in the first group, until the plurality of EPLs are exhausted.

14 Claims, 2 Drawing Sheets

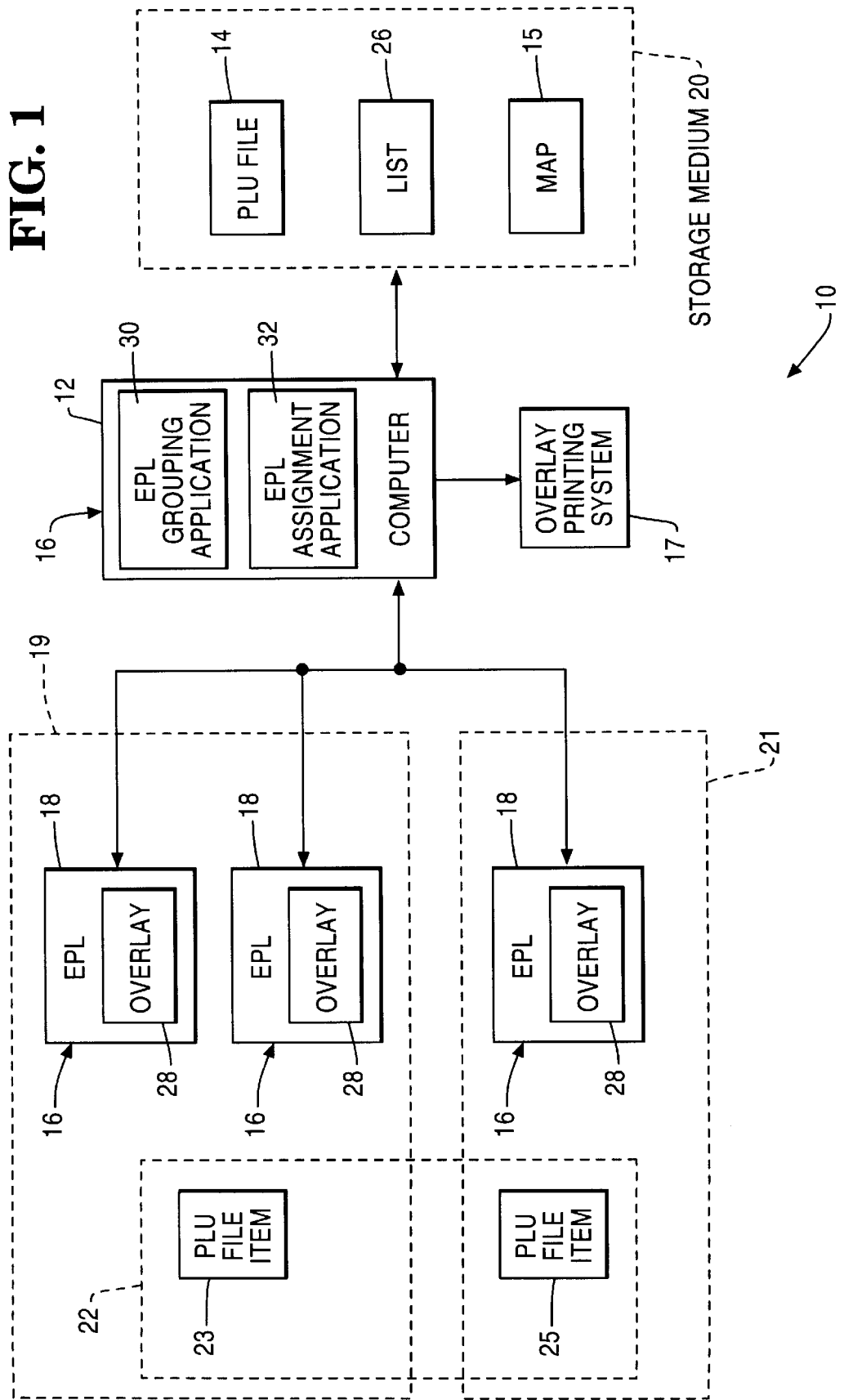

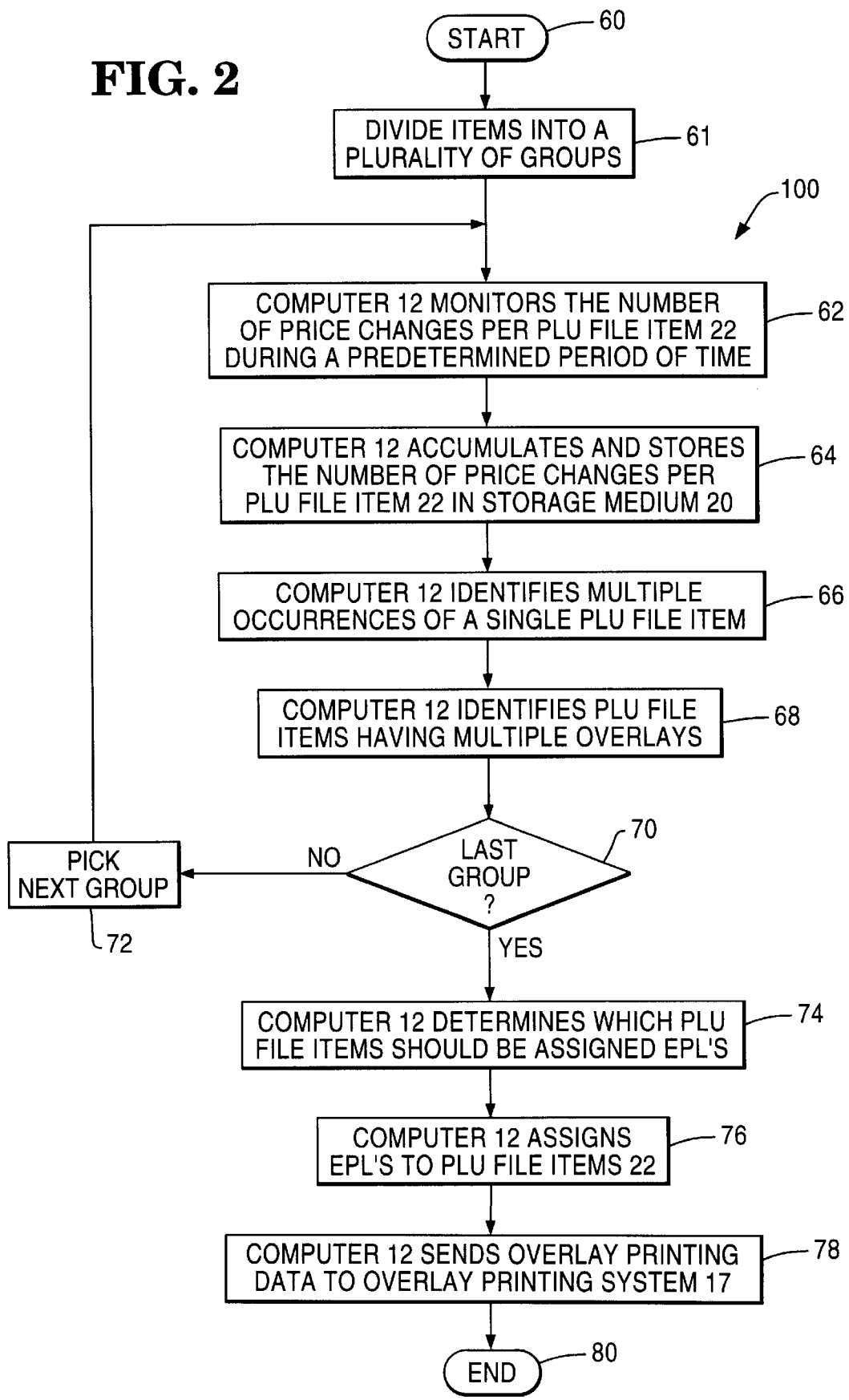

METHOD OF ASSIGNING ELECTRONIC PRICE LABELS TO GROUPS OF PRICE LOOKUP FILE ITEMS

CROSS-REFERENCE TO RELATED APPLICATION

The present invention is related to the following commonly assigned and co-pending U.S. application:

"Method Of Assigning Electronic Shelf Labels to Price-lookup File Items", filed Nov. 10, 1994, invented by Goodwin, and having a Ser. No. 08/338,055.

FIELD OF THE INVENTION

The present invention relates to shelf label systems, and more specifically to a method of assigning electronic shelf labels to groups of price-lookup file items.

BACKGROUND OF THE INVENTION

In a traditional retail store, bar code scanners rely on price information maintained within a price-lookup (PLU) file. The PLU file is typically stored in a single location at host server.

Electronic shelf label (EPL) systems typically include a plurality of electronic displays. The electronic displays are coupled to a central server from where prices for all of the displays can be changed.

In a typical installation, one electronic shelf label is assigned to each PLU item in the store. Decisions regarding EPL assignments are typically made by store personnel. The current process implemented by such personnel involves periodically scanning items within the store with a hand-held scanner and manually recording whether a price change occurred. Store personnel review the manually gathered statistics and determine EPL assignments. This method is expensive and time consuming.

Therefore, it would be desirable to provide a method for assigning electronic shelf labels to PLU file items which minimizes decisions by store personnel and maximizes a store's return on investment in the electronic shelf label system.

SUMMARY OF THE INVENTION

In accordance with the teachings of the present invention, a method of assigning electronic shelf labels to groups of price-lookup file items is provided.

The items are divided into a plurality of groups. Price change frequencies for items within each group are determined. A minimum price change frequency for each group is determined. In a first embodiment, EPLs are assigned to items in any one of the groups only if a predetermined number of the price change frequencies in the one group exceed a predetermined minimum price change frequency for the one group. In a second embodiment, the groups are ranked starting with a first group having a highest number of items that exceed the minimum price change frequency for the first group and ending with a second group having a lowest number of items that exceed the minimum price change frequency for the second group, and EPLs are assigned to a plurality of items less than the totality of items by order of rank of the groups, beginning with the items in the first group, until the plurality of EPLs are exhausted.

It is accordingly an object of the present invention to provide a method of assigning electronic shelf labels to groups of price-lookup file items.

It is another object of the present invention to provide a method of assigning electronic shelf labels to groups of price-lookup file items in which a predetermined number of items have prices that change at a frequency greater than a predetermined minimum frequency.

It is another object of the present invention to provide a method of assigning electronic shelf labels to groups of price-lookup items which maximizes a store's return on investment in an electronic shelf label system.

It is another object of the present invention to provide a method of assigning electronic shelf labels to groups of price-lookup items which minimizes decisions by store personnel regarding EPL assignments.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 1 is a block diagram of a computer network within a store; and

FIG. 2 is a flow diagram illustrating a method of assigning EPLs to groups of merchandise items.

DETAILED DESCRIPTION OF THE PREFERRED EMBODIMENT

Referring now to FIG. 1, store system 10 includes computer 12, price-lookup (PLU) file 14, electronic shelf label (EPL) system 16, and overlay printing system 17.

Computer 12 analyzes price change information for PLU file items 22 and produces a sorted list 26. List 26 includes PLU file items 22 in order of price change for each group of items 22 in a store. Computer 12 assigns EPLs 18 under the method of the present invention and passes EPL and EPL overlay information, manually or automatically, to overlay printing system 17. Group 21 represents an assignment of one EPL 18 to one PLU file item 25.

Computer 12 also identifies multiple occurrences of the same PLU file item. Group 19 represents a single PLU file item 23 which is located at two different places within the store and which requires multiple EPLs 18 having the same overlay at each location. Computer 12 also identifies PLU file items requiring multiple EPLs 18, each having a different overlay 28, from map 15 within storage medium 20.

Computer 12 may be a host computer in a store network. Alternatively, computer 12 may be located within EPL system 16 while another server in system 10 handles transaction processing requests, such as requests for prices from PLU file 14.

PLU file 14 contains price information about store file items 22. The price information for one file item may change at a frequency different than any other file item. PLU file 14 is stored within a storage medium 20 associated with computer 12.

EPL system 16 further includes a plurality of EPLs 18 assigned to PLU file items 22. As indicated above, EPL system 16 may additionally include computer 12 when another computer is available in system 10 for handling transaction processing.

Each of EPLs 18 includes a printed overlay 28 for displaying information about PLU file items 22. Overlay printing system 17 prints overlays 28 after EPLs 18 are assigned to PLU file items 22. Overlay printing system 17 may be located at the point of manufacture of EPLs 18 or at some other location outside of the store.

EPL grouping application 30 sorts the accumulated numbers of price changes for PLU file items 22 into identified groups. A group may be a manufacturer, a category of products (e.g., perfumes), or any other classification of PLU file items 22. A sorting by manufacturer is the simplest method of grouping, since the first five digits in a universal product code (UPC) identify the manufacturer. A sort by some other category requires that the category information be made available to computer 12. The groups may be identified primarily from historical price change frequency information, reflecting groups of PLU file items exhibiting high price change frequencies.

Category information may be added to PLU file 14 or electronically joined or connected to PLU file 14 (category information doesn't have to be inside the PLU file). For example, a PLU number may be used as an index for accessing category information in a separate category file.

EPL assignment application 32 assigns EPLs to groups of items 22 identified by EPL grouping application 30. The effect of the sort into groups presupposes that all of the PLU file items within the identified groups will be assigned EPLs, although this may not be the case in actual practice. In cases where all of the PLU file items have been grouped, but there are not enough EPLs to assign, individual PLU file items may be ranked within a group or groups, leaving some of the PLU file items in each group without EPLs. Alternatively, groups themselves may be ranked by the average of price change frequency of each group and EPLs assigned starting with the group having the highest average. In the latter case, only the last group of items will contain some file items for which an EPL is not available.

Turning now to FIG. 2, a method 100 of assigning EPLs to items 22 begins with START 60.

In step 61, items are divided into groups by EPL grouping application 30.

In step 62, computer 12 monitors the number of price changes per PLU item for items for a group identified by EPL grouping application 30 during a predetermined period of time.

In step 64, computer 12 accumulates and stores the number of price changes from step 62 for the group in storage medium 20.

In step 66, computer 12 identifies multiple occurrences of a single PLU file item within the group within the store. Such PLU file items would each require more than one of the EPLs 18, if that PLU file item evidenced a high enough price change frequency. Computer 12 employs map 15 of PLU file items 22 within the store to determine the multiple occurrences. Map 15 may be a standard store scan file or a standard planogram file.

In step 68, computer 12 identifies, within the group, PLU file items having multiple overlays from map 15. During creation of map 15, a PLU file item having multiple overlays must be scanned or entered in the case of the planogram as many times as there are overlays for that PLU file item.

In step 70, the method determines whether the group is a last group. If not, operation proceeds to step 72 to pick another group and afterwards to step 62. If so, the method proceeds to step 74.

In step 74, computer 12 determines for each group how EPLs 18 should be assigned to PLU file items 14. The present invention includes two embodiments.

In a first embodiment, the method assumes that no limit on the number of available EPLs exists and that PLU file items within each group will be assigned EPLs only if a predetermined number of the price change frequencies of the PLU file items exceed a predetermined minimum price change frequency for the group. Thus, the method determines which groups are assigned EPLs 18 based on the comparison of individual price change frequencies to a group threshold, and assigns EPLs to all PLU file items in those groups.

In a second embodiment, the method assumes a fixed number of EPLs and that EPLs are assigned to groups, starting with the group having the highest number of items that exceed the predetermined minimum price change frequency, until the EPLs are exhausted.

In the case of a tie between groups, an arbitrarily chosen group may be entered into computer 12. The choice may be based on a predetermined preference for one manufacturer over another, or one category over another.

In step 76, computer 12 assigns EPLs 18 to PLU file items 22 in accordance with the determination of step 74.

In step 78, computer 12 sends the map of EPL and overlay printing data to overlay printing system 17 and the method ends at END 80.

The method of FIG. 2 may be implemented indefinitely to optimize EPL assignments in a dynamic store environment. EPL assignment application 32 notifies an operator of assignments through printed or displayed reports. This report will include a recommendation to remove EPLs from one product within a group when those EPLs can be better utilized by another group, particularly when paper price labels are suitable for the one product.

Although the present invention has been described with particular reference to certain preferred embodiments thereof, variations and modifications of the present invention can be effected within the spirit and scope of the following claims.

What is claimed is:

1. A method of automatically assigning electronic price labels to items within a group utilizing a computer system, the method comprising the steps of:

determining price change frequencies for items within the group utilizing the computer system;

assigning electronic price labels to the items within the group utilizing the computer system only if a predetermined number of the price change frequencies exceed a predetermined minimum price change frequency for the group.

2. A method of automatically assigning electronic price labels to items utilizing a computer system, the method comprising the steps of:

dividing the items into a plurality of groups;

determining price change frequencies for items within each group;

determining a minimum price change frequency for each group; and assigning electronic price labels to items in any one of the groups only if a predetermined number of the price change frequencies in the one group exceed a predetermined minimum price change frequency for the one group.

3. A method of automatically assigning a predetermined number of electronic price labels to a plurality of items less than a totality of items utilizing a computer system, the method comprising the steps of:

dividing the totality of items into a plurality of groups;

determining price change frequencies for items within each group;

determining a minimum price change frequency for the items in each group;

determining a number of items in each group that exceed the minimum price change frequency for the group;

ranking the groups starting with a first group having a highest number of items that exceed the minimum price change frequency for the first group and ending with a second group having a lowest number of items that exceed the minimum price change frequency for the second group; and assigning electronic price labels to the plurality of items by order of rank of the groups, beginning with the items in the first group, until the plurality of electronic price labels are exhausted.

4. The method of any one of claims 1-3 wherein each of said items has a corresponding price look up file entry stored in a memory, and the method further comprises the steps of:

analyzing price change information for each of said items for a predetermined period of time utilizing the computer system; and producing a sorted list of said items in order of price change frequency.

5. The method of any one of claims 1-3 further comprising the step of:

generating a report of the assignments of the electronic price labels to the items within the group.

6. The method of any one of claims 1-3 further comprising the step of:

identifying items which occur multiple times in a price look up file listing the items.

7. The method of any one of the claims 1-3 further comprising the step of:

printing overlays for the electronic price labels utilizing an overlay printing system after electronic price labels are assigned to the items.

8. The method of claim 1 further comprising the step of:

sorting the items into identified groups before said step of determining.

9. The method of claim 8 further comprising the step of:

accumulating the number of price changes for the items over a predetermined period of time.

10. The method of claim 2 further comprising the step of:

ranking the plurality of groups by average price change frequency.

11. The method of any one of claims 1-3 further comprising the step of:

producing a recommendation that an electronic price label be removed from one item where the computer system has determined that the electronic price label can be better utilized in conjunction with another item.

12. An electronic price label system for automatically assigning a plurality of electronic price labels to a plurality of items comprising:

a memory storing a price look up file including price information for said plurality of items;

a computer operably connected to the price look up file, said computer being operable to divide the plurality of items into groups, to determine price change frequencies for the plurality of items, and to assign the plurality of electronic price labels to individual ones of said plurality of items only if a predetermined number of the price change frequencies for items in a group exceed a predetermined minimum price change frequency for the group.

13. The electronic price label system of claim 12 further comprising a report generator for generating a report listing the assignments of electronic price labels to individual ones of said plurality of items.

14. The electronic price label system of claim 12 further comprising a mapping of items stored in the memory and wherein the computer system is further operable to determine the location of multiple occurrence items corresponding to the same entry in a price look up file utilizing said mapping.

* * * * *